(12) United States Patent
Yeh

(10) Patent No.: US 6,763,942 B1
(45) Date of Patent: Jul. 20, 2004

(54) CARRYING BAG FOR PORTABLE COMPUTER

(75) Inventor: Falcon Yeh, Taipei (TW)

(73) Assignee: Mitac International Corp., Hsinchu (TW)

( * ) Notice: Subject to any disclaimer, the term of this patent is extended or adjusted under 35 U.S.C. 154(b) by 0 days.

(21) Appl. No.: 10/339,492

(22) Filed: Jan. 10, 2003

(51) Int. Cl.[7] .............................................. B65D 85/00
(52) U.S. Cl. ...................... 206/320; 206/771; 190/119
(58) Field of Search ................................. 206/320, 751, 206/45.2, 45.23, 769, 771; 190/105, 119, 127, 902

(56) References Cited

U.S. PATENT DOCUMENTS

| | | | | |
|---|---|---|---|---|
| 4,951,818 A | * | 8/1990 | Johnson ..................... | 20/315.1 |
| 4,984,662 A | * | 1/1991 | Jacober ...................... | 10/107 |
| 5,010,988 A | * | 4/1991 | Brown ....................... | 190/104 |
| D405,267 S | * | 2/1999 | Cowan ........................ | D3/303 |
| 5,887,777 A | * | 3/1999 | Myles et al. ................ | 224/578 |
| 5,996,778 A | * | 12/1999 | Shih ........................... | 206/45.2 |
| 6,149,001 A | * | 11/2000 | Akins ......................... | 206/320 |
| 6,174,082 B1 | * | 1/2001 | Pelky et al. .................. | 383/22 |
| 6,202,846 B1 | * | 3/2001 | Hess .......................... | 206/457 |
| D439,742 S | * | 4/2001 | Fujino et al. ................ | D3/290 |
| 6,237,825 B1 | * | 5/2001 | Pencoske ..................... | 224/645 |
| 6,328,158 B1 | * | 12/2001 | Bisbal et al. ............... | 206/223 |
| 6,595,687 B2 | * | 7/2003 | Godshaw et al. ............. | 383/6 |

* cited by examiner

*Primary Examiner*—Shian T. Luong
*Assistant Examiner*—E. Paxton
(74) *Attorney, Agent, or Firm*—Birch, Stewart, Kolasch & Birch, LLP

(57) ABSTRACT

A carrying bag for a portable computer is adopted for carrying a portable computer with an exposed screen on its front side so that the computer is ready for use without unfolding the lid. The front side of the bag has a see-through section to enable users to view the computer screen or operate the button keys without removing the computer. The bag further has loops located on diagonal corners or four corners to couple with buckles of a shoulder strap so that the computer may be hung in front of a user for use wherever he/she goes. The bag has a back side engaging with a guarding flap, which may be folded reversely to form a support rack to hold the computer in the bag standing at a desired angle or on a table to match the user's viewing angle so that the user can use the computer on a still location. Users may browse or read information displayed on the computer screen through the see-through section without removing the computer from the bag when working on a still location.

13 Claims, 8 Drawing Sheets

CARRYING BAG FOR PORTABLE COMPUTER

FIELD OF THE INVENTION

The invention relates to a carrying bag for a portable computer and particularly a carrying bag for exposing the screen on the front side of the computer without unfolding the lid.

BACKGROUND OF THE INVENTION

A general portable computer or notebook computer has a scratch-resistant or strongly-built lid to protect the important and fragile screen. When in use, the lid must be unfolded. When not in use, the lid is closed to facilitate safe movement. However, when carrying outdoors, in order to prevent the computer from being hit or crushed by other carrying articles, users generally prepare a matching bag to hold and carry the computer. While the carrying bag can protect the valuable and fragile notebook computer, it creates many other problems. For instance, when using the computer, the user has to lay down the bag, unfasten the zipper, remove the computer, place the computer on a desk, connect the mouse, etc., then unfold the lid to operate the computer. When these tasks are finished and the computer is to be packed and stored, the actions mentioned above must be repeated in reverse order. They are time-consuming and have to be performed repeatedly. This is a huge waste of people's time. It's especially annoying to people who have to work outdoors such as engineers, soldiers, or persons who constantly move on the shop floor to collect data or perform auditing. In outdoor environments where clean or neat desks are not available, to unpack and hold the computer in a good working condition is difficult or impossible. Moreover, on rainy days and in damp and foul environments where office facilities are wanted, the carrying bag does not provide much help to facilitate computer operation for users. It could happen that users have to hold the computer with one hand and operate the computer with other hand. All this creates a negative impact on user's efficiency and productivity.

There are special purpose portable computers being developed that do not have lids to facilitate operation and information retrieval. Those computers do not have lids but have an exposed screen. While they save the trouble of folding and unfolding the lid, the screen held in the bag is not visible from the outside and not ready for use. Users still have to remove the computer from the bag before use. Thus the computers with an exposed screen now available on the market still have operational problems.

SUMMARY OF THE INVENTION

In order to fulfill the needs mentioned above, the primary object of the invention is to provide a carrying bag for a portable computer that enables a user to carry a computer with an exposed screen wherever he/she likes and use it whenever desired. Another object is to provide a carrying bag that has a self support function for standing up by itself at a desired angle or on a table to facilitate operation.

According to one embodiment of the invention, the front side of the bag has a see-through section to enable users to look at information on the computer screen and/or operate the keyboard or touch screen without removing the computer from the bag.

In addition, there are loops located on the diagonal or four corners of the bag to couple with buckles or hooks located at two ends of a shoulder strap so that the computer may be held at a usable position wherever the user goes.

On one side of the bag, there is a guarding flap to cover and protect the see-through section on the front side of the bag. The guarding flap may be folded reversely to become a support rack on the back side of the bag to hold the bag and the computer in the bag at a desired angle or on a table so that the screen may be positioned steadily like a conventional computer screen to match the user's viewing angle.

Moreover, because of the design of the see-through section on the front side of the bag, when the computer is held at a standing position by means of the support rack on a still location, users can browse the information on the computer screen through the see-through section without removing the computer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
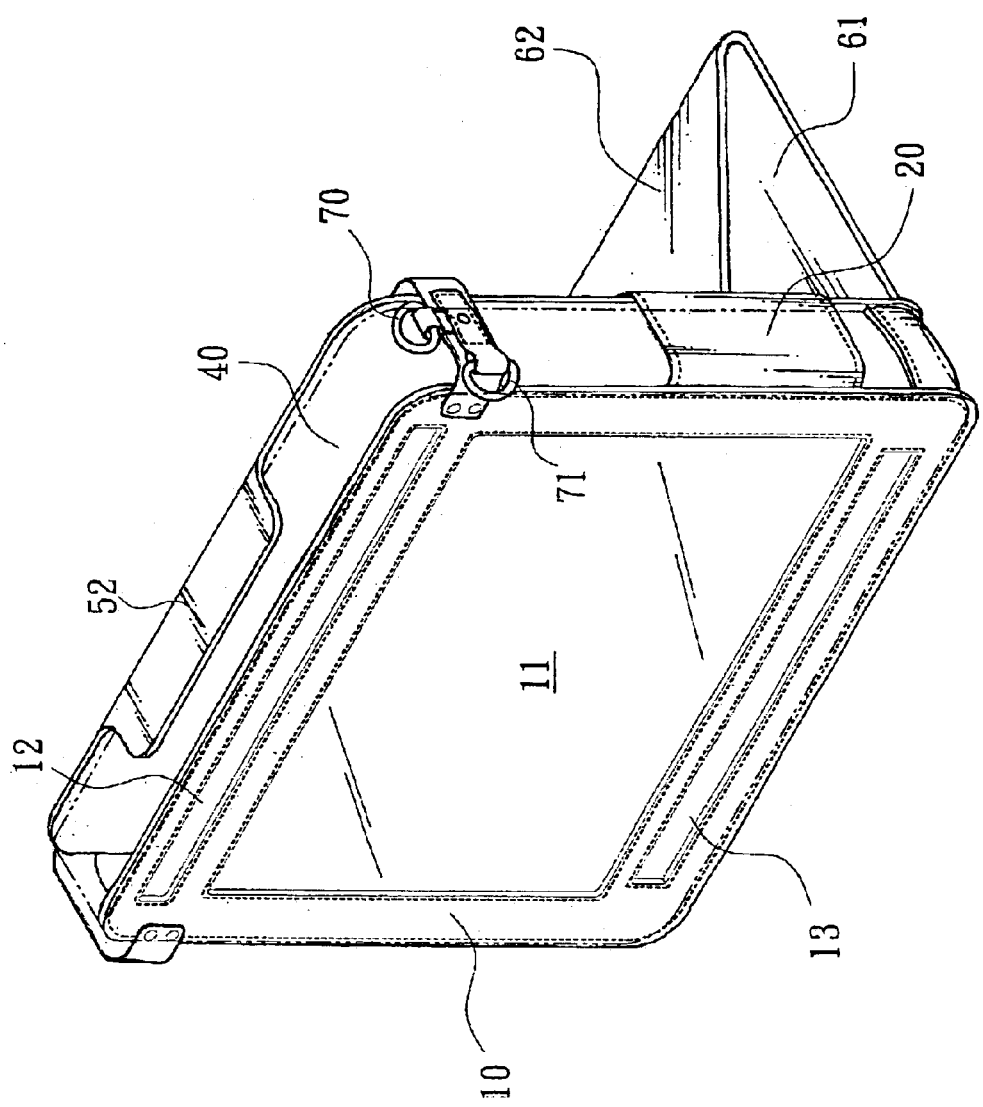
FIG. 1 is a perspective view of a first embodiment of the invention, with loops located on the upper right and lower left corners to couple with the buckles of a shoulder strap to enable users who are left-handed to hang the computer in front of their body when in use. The perspective view also shows the guarding flap folded reversely to form a support rack to hold the computer in the bag at an upright position.

Refer to FIG. 1 for an embodiment of the carrying bag of the invention. The dash lines illustrate a portable computer with an exposed screen (as it is known in the art, details are omitted). In the following discussion, the upper side, lower side, left side and right side are named based on the spatial perspective of the drawings shown.

According to one embodiment of the invention, the carrying bag includes a front side 10, a back side 50, a left side 30, a right side 20 and a bottom side (not shown in the drawings). The bag has a top end 40, which has an opening for receiving or retrieving a portable computer of a selected specification. (shown by the dash lines).

Figure 4:
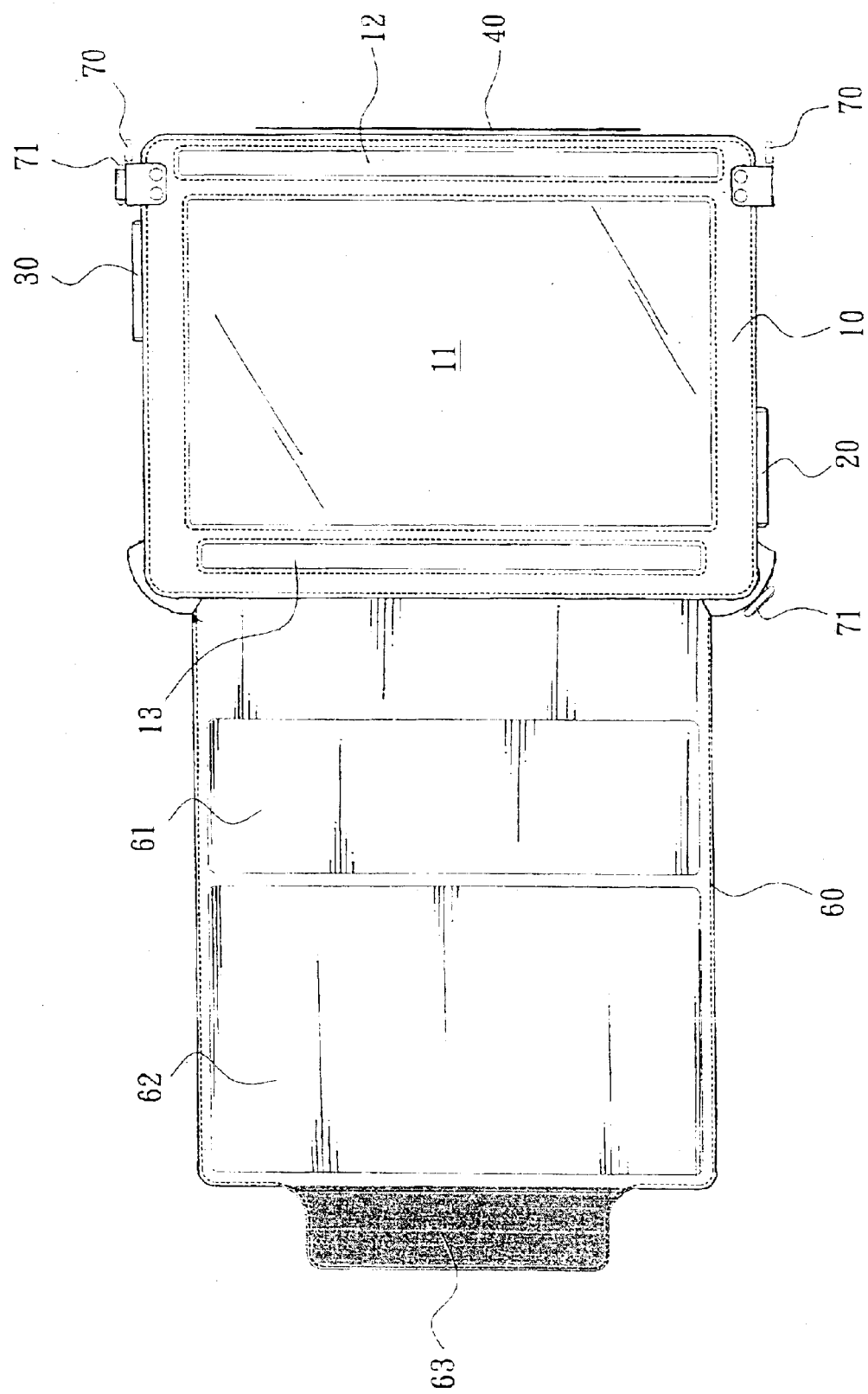
FIG. 4 is a plane view of the second embodiment of the invention showing the front side of the bag in an extended condition.

Referring to FIG. 4, the front side 10 has a first see-through section 11 to enable users to see the computer screen (not shown in the drawings) held in the bag. Beside the first see-through section 11, there is a second see-through section 12 and a third see-through section 13 that allow users to see various function keys located in the neighborhood of the screen, such as command keys for direction, brightness, contrast, audio volume, forward paging, selection, hand writing input, confirmation, etc. The see-through sections 11, 12 and 13 may be formed by carving openings on the leather, stitching or bonding a transparent sheet on leather over the carved openings, or using a transparent sheet to form the entire front side 10. The main purpose is to enable users to directly see the computer screen and/or the keys without opening the bag. The first see-through section 11 aims at improving the aesthetic appeal of the front side 10 of the bag. It may be formed in a desired shape other than the pattern or proportion shown in the drawings as long as it makes the computer screen and keys visible from the outside.

Figure 3:
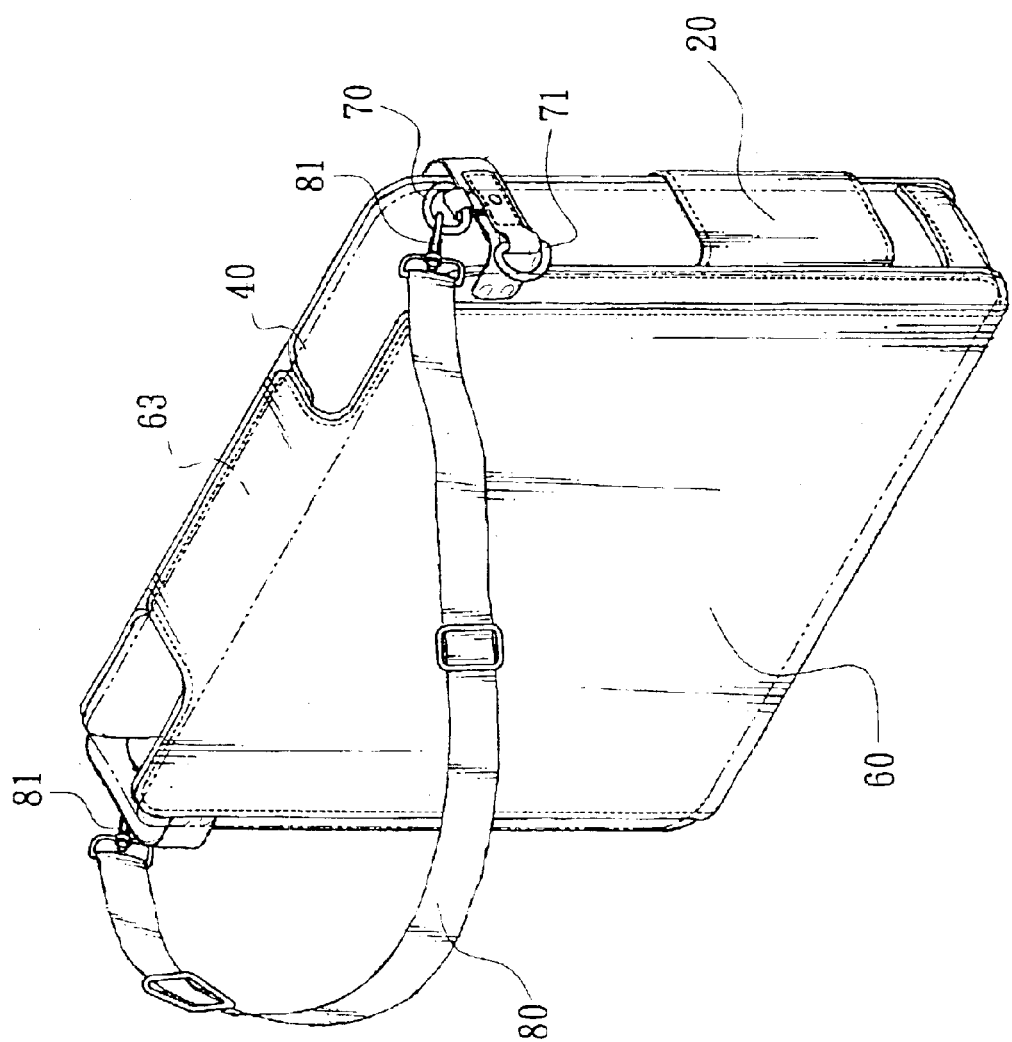
FIG. 3 is a perspective view of the second embodiment of the invention with the guarding flap covering the computer screen.
Figure 6:
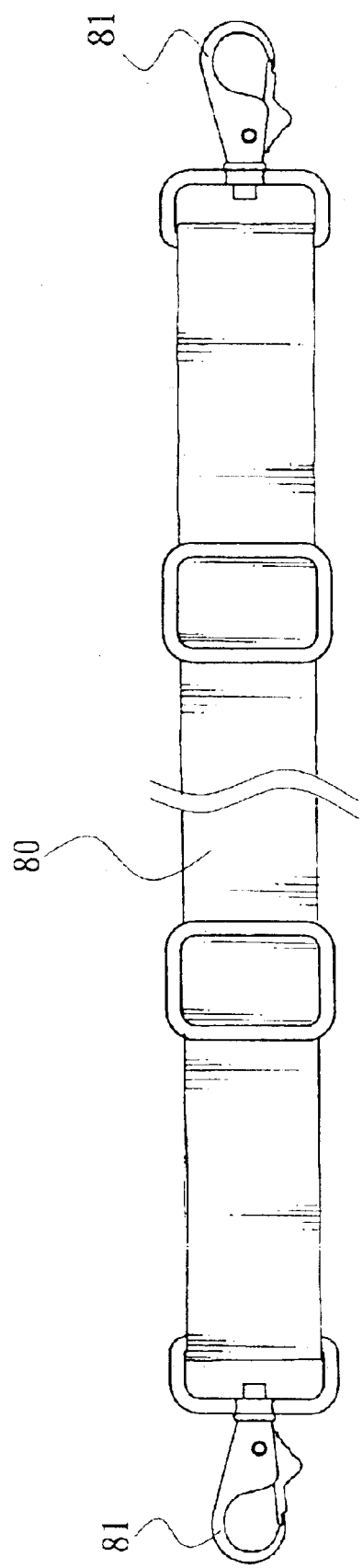
FIG. 6 is a plane view of a shoulder strap of the invention used in various embodiments.

FIG. 4 illustrates another embodiment of the invention. The bag has one side engaging with a guarding flap 60 for covering the first see-through section 11. The guarding flap 60 has one end attached to a first connection element 63, which may be engaged with a second connection element 52 located on the top end of the bag to form a three dimensional structure as shown in FIG. 3. The top end 40 has two sides, each coupling with a loop 70 to engage with a buckle 81 located on either end of a shoulder strap 80 (shown in FIG. 6) to enable a user to shoulder the carrying bag and the computer like a conventional business case. The connection elements mentioned above may be selected from any elements known in the art that provide the connecting function required, such as a male button coupling with a female button, a hook and a ring, or a hook and loop band (Velcro tape), as long as they enable the guarding flap 60 to couple with the top end 40. It is to he noted that any element that can provide the desired connecting function may be used. The descriptions, pictures, proportions or examples set forth above are only examples, and should not be seen as the limitation of the invention.

Figure 2:
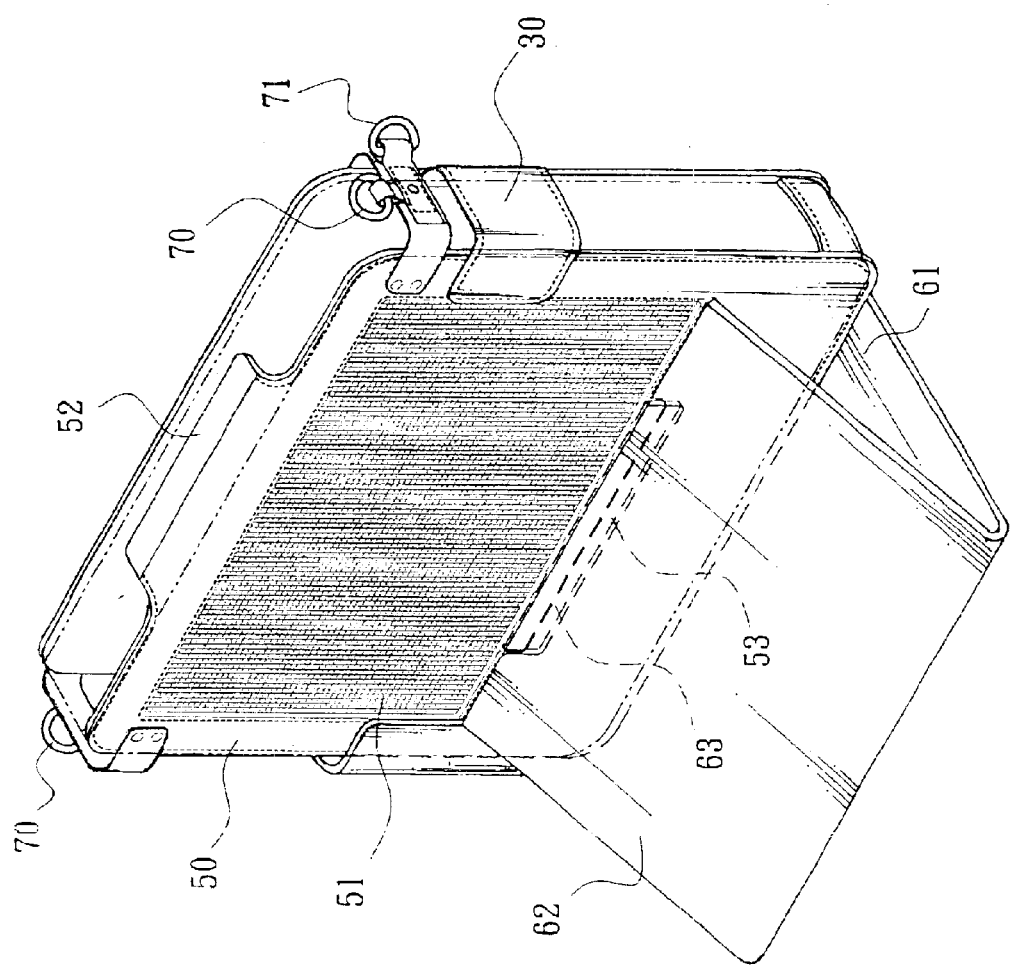
FIG. 2 is a perspective view of a second embodiment of the invention, with the loops located on the upper left and lower right corners to couple with the buckles of a shoulder strap to enable users who are right-handed to hang the computer in front of their body when in use. The perspective view also shows the guarding flap folded reversely to form a support rack to hold the computer in the bag at an upright position.

Referring to FIG. 4, the guarding flap 60 may further include an inner lining made from a hard material to form a first reinforced section 61 and a second reinforced section 62 to provide adequate protection for the computer contained in the bag. The first reinforced section 61, the second reinforced section 62 and the first connection element 63 may be folded reversely to couple with one another to form a support rack on the back side 50 of the bag, as shown in FIGS. 1 and 2.

Figure 5:
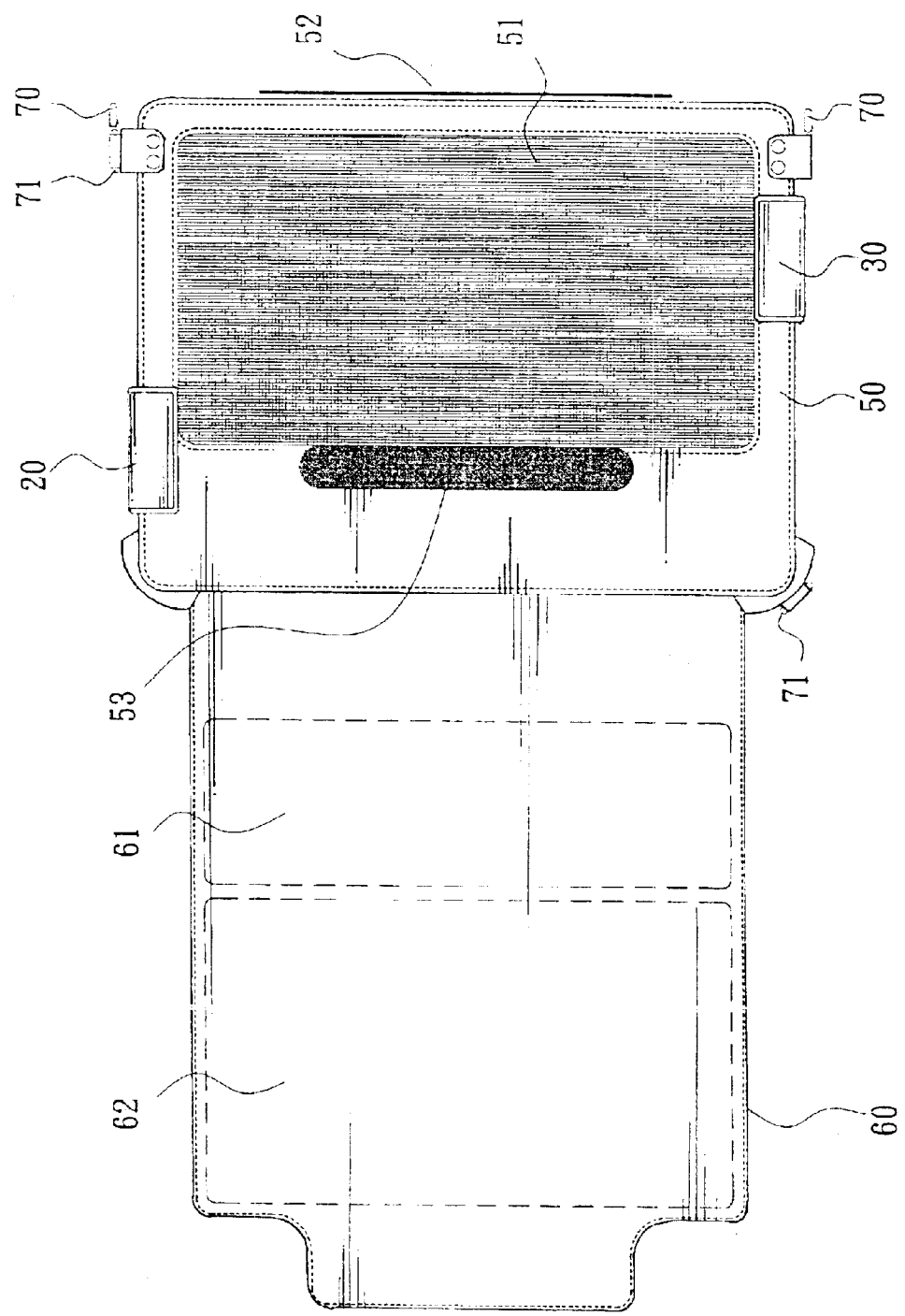
FIG. 5 is a plane view of the second embodiment of the invention showing the back side of the bag in an extended condition.

Referring to FIG. 5, the back side 50 of the bag may also have an air permeable section 51 to allow heated air in the bag to dissipate to facilitate heat dissipation of the computer. The permeable section 51 may be made from a porous material to facilitate air ventilation. The material may be a mesh, an air permeable fabric or the like, as long as it can help the computer to dissipate heat.

Based on the previous embodiments, a third connection element 53 may be disposed on the back side 50 of the bag to connect to the first connection element 63 of the guarding flap 60. The connection elements may also be selected from any known elements that provide the connecting function required, such as a male button coupling with a female button, a hook and a ring, a hook and loop band (Velcro tape) or the like. The connection elements aim at enabling the end of the guarding flap 60 to anchor on the back side 50 of the bag so that the first reinforced section 61, the second reinforced section 62 and the first connection element 63 may be folded reversely to couple with one another to form a support rack and keep the bag in a steady condition. Any element that can achieve the function required may be selected to substitute for the connection elements 63, 52 or 53.

Figure 7:
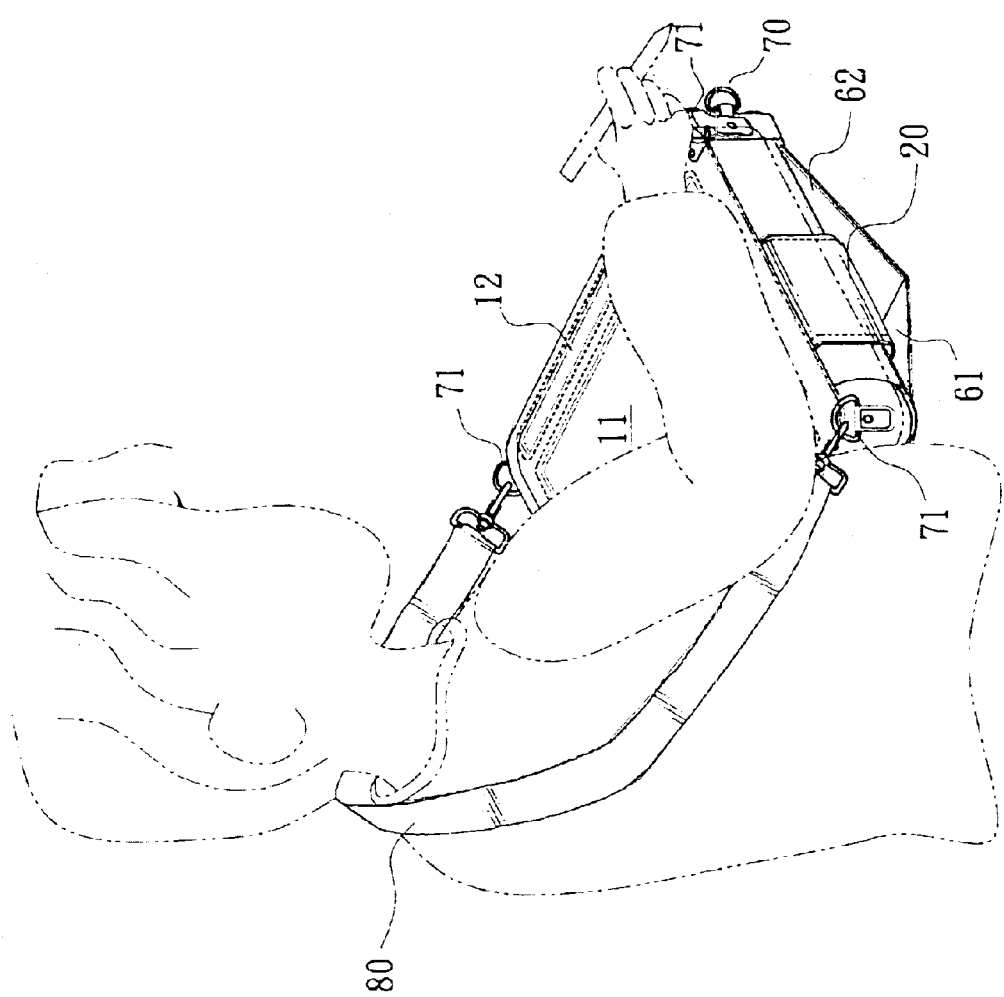
FIG. 7 is a schematic view of a third embodiment of the invention with the loops located on four corners of the bag adopted for a right-handed user.
Figure 8:
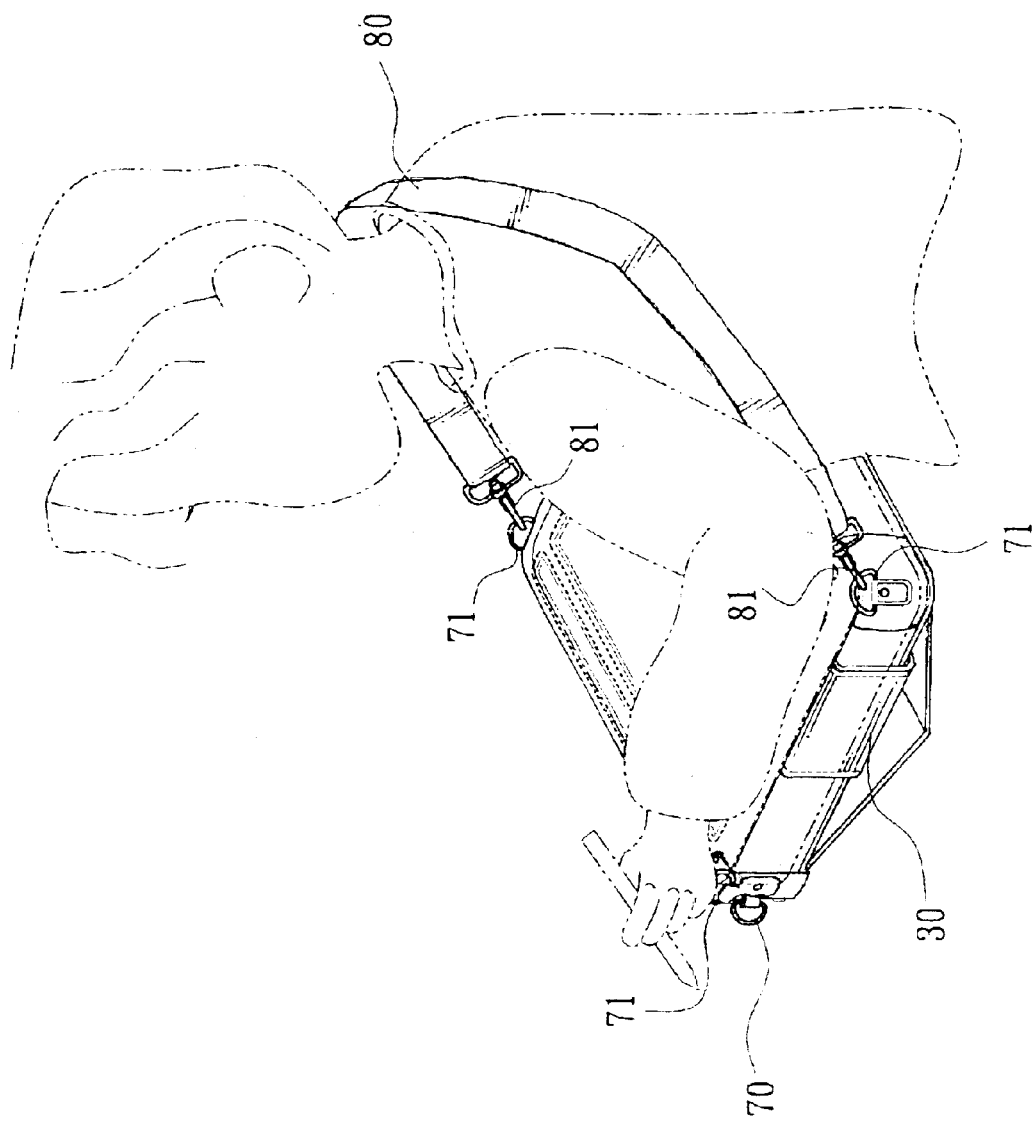
FIG. 8 is a schematic view of the third embodiment of the invention adopted for a left-handed user.

In order to enable the computer to be hung in front of the user when in use, the diagonal corners of the bag may be fastened to loops 71. FIG. 7 shows an embodiment that has a shoulder strap 80 coupling with the loops 71 located on the upper left corner and the lower right corner to allow a right-handed user to straddle the shoulder strap from the left shoulder to the lower right corner to connect the bag. Thus the user may operate the computer while walking around to access the information required. FIG. 8 shows another embodiment that has the shoulder strap 80 straddling from the user's right shoulder and has the buckles 81 engaging with the loops 71 located on the front right corner and the lower left corner of the bag for a left-handed user.

Of course, every corner or rim of the bag may be coupled with a loop to engage with the shoulder strap in a desired fashion to meet the requirements of the users, whether they are right-handed or left-handed.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A carrying bag for a portable computer, comprising at least:

a front side having a first see-through section for viewing a computer with an exposed screen and operation keys of the computer;

a left side, a right side and a bottom side connecting to the front side; and a back side connecting to the left side, the right side and the bottom side;

wherein the bag has an openable top end and one side connecting to a guarding flap which has a desired dimension to fully cover the first see-through section, and wherein the guarding flap has an inner lining made from a hard material to form two independent reinforced sections, the guarding flap further has one end attached to a first connection element, the bag having a top end and a back side, the top end or the back side of the bag having a second connection element corresponding to the first connection element to allow the one end of the guarding flap to anchor on the top end or the back side of the bag in a detachable manner.

2. The carrying bag for a portable computer of claim 1, wherein the corresponding connection elements are hook and loop bands that are bondable to each other.

3. The carrying bag for a portable computer of claim 1, wherein the one end of the guarding flap is anchored on the back side of the bag to form a support rack to raise the bag at a selected angle or an upright position on a flat surface.

4. The carrying bag for a portable computer of claim 1, wherein the back side of the bag has an air permeable section for dissipating heat inside the bag to facilitate heat dissipation of the computer located in the bag.

5. The carrying bag for a portable computer of claim 4, wherein the air permeable section is formed by forming air ventilation holes on the back side of the bag.

6. The carrying bag for a portable computer of claim 4, wherein the air permeable section is formed by connecting one or more air permeable fabrics to the back side of the bag.

7. The carrying bag for a portable computer of claim 6, wherein the air permeable fabrics are mesh type fabrics.

8. The carrying bag for a portable computer of claim 1, wherein the bag has a plurality of see-through sections corresponding respectively to the computer screen and function keys located on the front side of the computer.

9. The carrying bag for a portable computer of claim 1, wherein the first see-through section is made from one or more transparent leather sheets.

10. The carrying bag for a portable computer of claim 1, wherein the front side of the bag is made from a transparent leather sheet to form the first see-through section.

11. The carrying bag for a portable computer of claim 1, wherein the first see-through section on the front side of the bag is formed by cutting off a leather sheet on the front side of the bag to generate see-through effect.

12. The carrying bag for a portable computer of claim 1, wherein the bag has an upper left corner, a lower right corner, or an upper right corner and a lower left corner each coupling with a loop for engaging with a buckle fastened respectively to two ends of a shoulder strap to hang the bag and the computer contained in the bag in front of an user to facilitate operation.

13. The carrying bag for a portable computer of claim 1 further having a loop located on every corner or rim thereof to couple with a buckle fastened respectively to two ends of a shoulder strap to hang the bag and the computer contained in the bag in front of an user at a desired position to facilitate operation.

* * * * *